United States Patent
Asai et al.

(10) Patent No.: US 10,037,783 B2
(45) Date of Patent: Jul. 31, 2018

(54) WRAPPED DATA STORAGE DEVICE FOR REDUCING VIBRATION

(71) Applicant: Western Digital Technologies, Inc., Irvine, CA (US)

(72) Inventors: Yohei Asai, Fujisawa (JP); Kazuhide Ichikawa, Fujisawa (JP); Takanori Kawakami, Yokohama (JP); Miki Namihisa, Fujisawa (JP); Isao Kobayashi, Odawara (JP)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 15/388,633

(22) Filed: Dec. 22, 2016

(65) Prior Publication Data
US 2018/0182439 A1 Jun. 28, 2018

(51) Int. Cl.
*G11B 33/02* (2006.01)
*G11B 33/14* (2006.01)

(52) U.S. Cl.
CPC ............ *G11B 33/14* (2013.01); *G11B 33/027* (2013.01); *G11B 33/142* (2013.01)

(58) Field of Classification Search
CPC ...... G11B 33/14; G11B 33/027; G11B 33/142
See application file for complete search history.

(56) References Cited

U.S. PATENT DOCUMENTS

| | | | | |
|---|---|---|---|---|
| 5,510,954 A | * | 4/1996 | Wyler | G06F 1/18 360/99.25 |
| 5,837,934 A | * | 11/1998 | Valavanis | G11B 33/08 174/544 |
| 6,005,768 A | * | 12/1999 | Jo | G11B 33/08 248/638 |
| 6,023,392 A | | 2/2000 | Kim | |
| 6,324,054 B1 | * | 11/2001 | Chee | G11B 33/08 248/635 |

(Continued)

FOREIGN PATENT DOCUMENTS

JP 2002163885 A 6/2002

OTHER PUBLICATIONS

Aearo Technologies, Mounting Techniques for 2.5 Inch HDDs, 2 pages, downloaded on Aug. 18, 2016 from http://www.earsc.com/cmsPage/MountingTechniquesFor2_5InchHDDs.asp.

(Continued)

*Primary Examiner* — Lisa Lea Edmonds
(74) *Attorney, Agent, or Firm* — John D. Henkhaus

(57) ABSTRACT

A data storage device (DSD) is assembled with a flexible sheet of barrier material covering at least a portion of the top cover and/or bottom base of the DSD enclosure, whereby a layer of air is between the sheet of barrier material and the cover and/or base. Polyvinlyidene chloride (PVDC) may be used as the barrier material. A wrap-around structure may be used for the barrier material, enveloping the DSD so that an open end can be positioned open to a primary direction of airflow, such that a respective layer of air is created between the barrier material and each of the cover and/or base. An adhesive may be positioned around the outer edge of the cover and/or base, to adhere the sheet of barrier material to the respective cover and/or base while allowing the air layer to fill the space therebetween.

15 Claims, 6 Drawing Sheets

(56) References Cited

U.S. PATENT DOCUMENTS

| | | | |
|---|---|---|---|
| 6,375,780 B1* | 4/2002 | Tuttle | G01S 13/758 156/226 |
| 6,473,263 B2 | 10/2002 | Jang et al. | |
| 6,636,378 B2 | 10/2003 | Tokunaga et al. | |
| 7,167,360 B2* | 1/2007 | Inoue | G06F 1/181 174/544 |
| 7,206,165 B2 | 4/2007 | Lee | |
| 7,291,784 B2* | 11/2007 | Moore | H05K 5/0213 174/17 VA |
| 7,746,230 B2* | 6/2010 | Tuttle | G01S 13/758 235/490 |
| 7,880,097 B2* | 2/2011 | Moore | G11B 33/142 174/480 |
| 8,995,119 B2 | 3/2015 | Thijssen et al. | |
| 9,282,681 B2* | 3/2016 | Rugg | H05K 7/20518 |
| 2003/0011980 A1* | 1/2003 | Albrecht | G06F 1/184 361/679.34 |
| 2005/0007733 A1* | 1/2005 | Byun | G11B 33/08 361/679.34 |
| 2005/0168935 A1* | 8/2005 | Inoue | G06F 1/184 361/679.34 |
| 2006/0002006 A1 | 1/2006 | Lee | |
| 2006/0087763 A1 | 4/2006 | Chua et al. | |
| 2006/0181845 A1* | 8/2006 | Shah | G11B 33/12 361/679.4 |
| 2007/0065047 A1 | 3/2007 | Kojima et al. | |
| 2008/0310096 A1* | 12/2008 | Sandesara | G11B 33/025 361/679.34 |
| 2015/0062800 A1* | 3/2015 | Cariker | G11B 33/025 361/679.34 |

OTHER PUBLICATIONS

Todd Haselton, NEC and Hitachi team to water-cool hard drives, arstechnica.com Gear & Gadgets, Aug. 3, 2007, 3 pages, Wired Media Group, downloaded on Aug. 19, 2016 from http://arstechnica.com/gadgets/2007/08/nec-and-hitachi-team-to-water-cool-hard-drives/.

European Patent Office, International Search Report and Written Opinion of the International Searching Authority for PCT/2017/049474, dated Nov. 22, 2017, 11 pages.

\* cited by examiner

WRAPPED DATA STORAGE DEVICE FOR REDUCING VIBRATION

FIELD OF EMBODIMENTS

Embodiments of the invention may relate generally to data storage devices and more particularly to reducing the effect of vibration within a data storage device.

BACKGROUND

A hard disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write head that is positioned over a specific location of a disk by an actuator. A read-write head uses a magnetic field to read data from and write data to the surface of a magnetic-recording disk. A write head makes use of the electricity flowing through a coil, which produces a magnetic field. Electrical pulses are sent to the write head, with different patterns of positive and negative currents. The current in the coil of the write head induces a magnetic field across the gap between the head and the magnetic disk, which in turn magnetizes a small area on the recording medium.

Often, one or more HDDs are housed in a system chassis, such as in the case of a data storage system, a server system, and the like. However, housing HDDs in a system chassis can have undesirable degrading effects on the operational performance of the HDDs, due to various factors within the environment of the chassis.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF EMBODIMENTS

Embodiments of the invention are generally directed at a data storage device, a data storage system, and a method of assembling a data storage assembly. The data storage device (DSD) is assembled with a flexible sheet of barrier material covering at least a portion of the top cover and/or bottom base of the DSD enclosure, whereby a layer of air is between the sheet of barrier material and the cover and/or base. An embodiment includes using a sheet of polyvinlyidene chloride (PVDC) as the barrier material, at least in part due to the sound absorption and/or sound insulation properties of the material.

Embodiments may include use of a wrap-around (or "bag like") structure for the barrier material, where the wrap-around structure has at least one open end and envelopes the DSD on at least four of its sides (e.g., top, bottom, and two sides). Hence, an open end of the wrap-around structure can be positioned open to a primary direction of airflow, such as that generated by a cooling fan in a system chassis, such that a respective layer of air is created between the barrier material and each of the DSD top cover and the DSD enclosure base.

Embodiments may include an adhesive positioned (at least intermittently) around the outer edge of the top cover and/or bottom base, to adhere the sheet of barrier material to the respective cover and/or base while allowing the air layer to fill the space between the sheet of barrier material and the respective cover and/or base.

Embodiments discussed in the Summary of Embodiments section are not meant to suggest, describe, or teach all the embodiments discussed herein. Thus, embodiments of the invention may contain additional or different features than those discussed in this section. Furthermore, no limitation, element, property, feature, advantage, attribute, or the like expressed in this section, which is not expressly recited in a claim, limits the scope of any claim in any way.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Approaches to a digital data storage device assembly are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of an Illustrative Operating Context

Embodiments may be used in the context of a digital data storage device (DSD) assembly, such as a hard disk drive (HDD), which may be housed within a larger enclosure or "rack", for example. Thus, in accordance with an embodiment, a plan view illustrating an HDD 100 is shown in FIG. 1 to illustrate an exemplary operating context.

Figure 1:
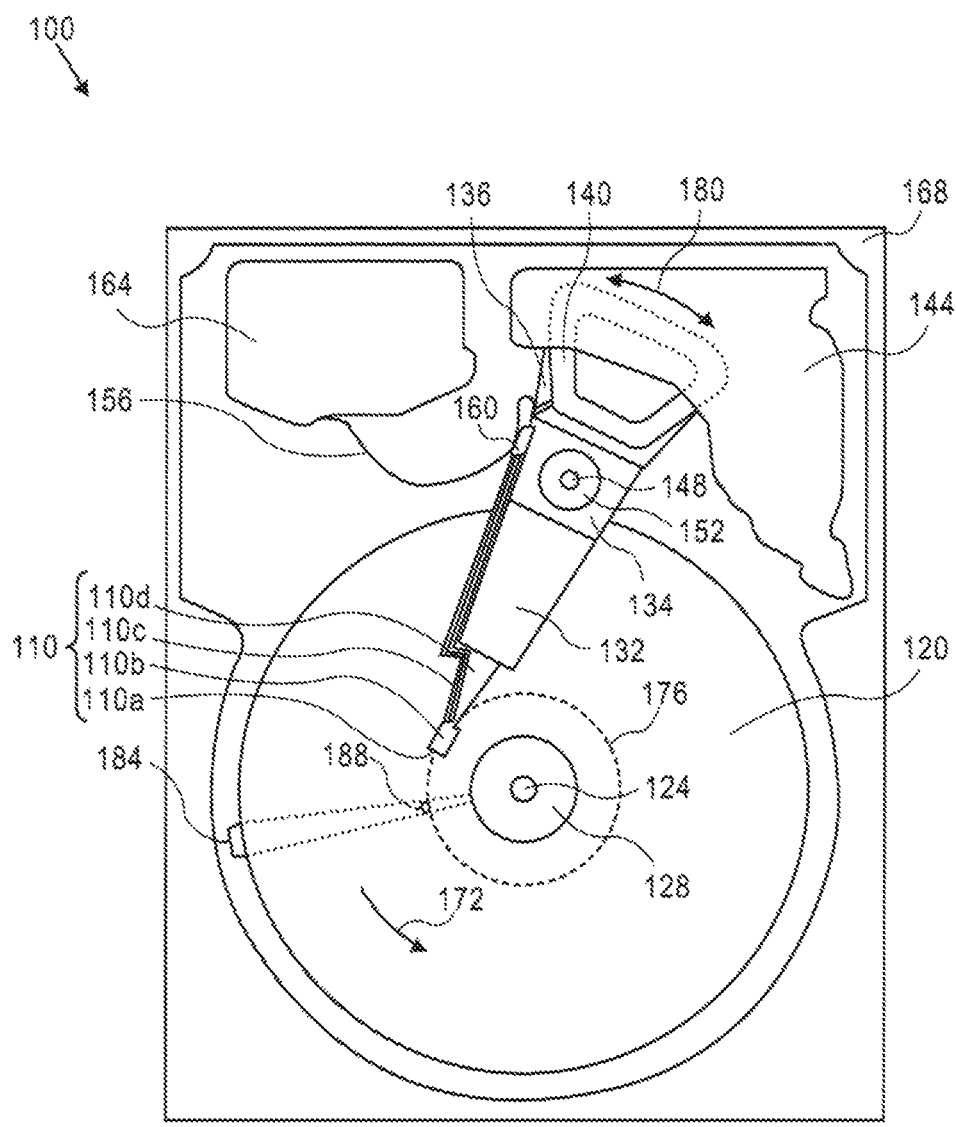
FIG. 1 is a plan view illustrating a hard disk drive (HDD), according to an embodiment.

FIG. 1 illustrates the functional arrangement of components of the HDD 100 including a slider 110*b* that includes a magnetic read-write head 110*a*. Collectively, slider 110*b* and head 110*a* may be referred to as a head slider. The HDD 100 includes at least one head gimbal assembly (HGA) 110 including the head slider, a lead suspension 110*c* attached to the head slider typically via a flexure, and a load beam 110*d* attached to the lead suspension 110*c*. The HDD 100 also includes at least one recording medium 120 rotatably mounted on a spindle 124 and a drive motor (not visible)

attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable"). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Introduction

The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees.

Figure 2:
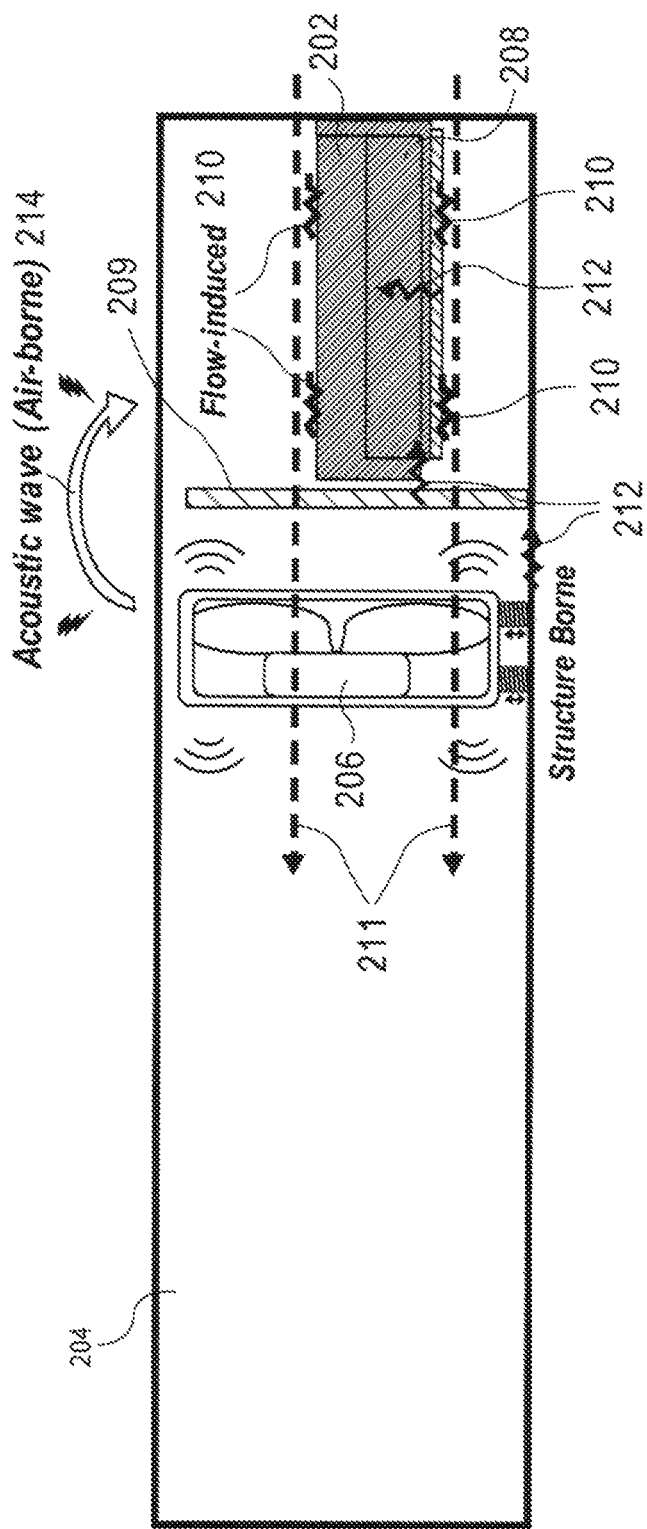
FIG. 2 is a side view illustrating a system chassis housing a data storage device, according to an embodiment.

FIG. 2 is a side view illustrating a system chassis housing a data storage device, according to an embodiment. System chassis 204 has a data storage device (DSD) 202 and a cooling fan 206 housed therein, where the DSD 202 may be mounted on a bracket 208 and plugged into a backboard 209 (e.g., a printed circuit board, or "PCB", comprising an electrical connector). As mentioned, housing HDDs (as one non-limiting type of DSD) in a system chassis can have undesirable degrading effects on the operational performance of the HDDs, due to various factors within the environment of the chassis. One significant contributor to HDD 202 performance degradation in this type of environment is vibration generated by operation of the cooling fan 206, and consequent deterioration of the head positioning accuracy within the HDD 202 that is caused by this vibrational "noise".

The vibration generated within the system chassis 204 by operation of the cooling fan 206 may be transferred to an HDD 202 (or a DSD, generally) housed therein by a number of ways. For example, the vibration may be fluid borne (i.e., flow-induced 210), by way of the airflow 211 generated around the HDD 202. For another example, the vibration may be structure borne 212, by way of transmission through the structural components such as the system chassis 204, the bracket 208, and the backboard 209. Yet another way that the vibration may be transferred to the HDD 202 is air borne 214, by way of acoustic waves (i.e., sound) generated by the cooling fan 206 and transmitted as vibrational energy through the air or possibly some other gas within the environment of the system chassis 204. Some storage system cooling fans may generate noise at frequencies over 5 kHz, for example, which are considered relatively high frequency and therefore difficult to overcome simply with servo system improvements. Any trend toward higher rotational speed cooling fans, coupled with the trend toward higher TPI (tracks per inch, a measure of areal density) HDDs, would only exacerbate the challenges associated with the vibrational energy and the consequent HDD performance degradation.

Wrapped Data Storage Device

Figure 3:
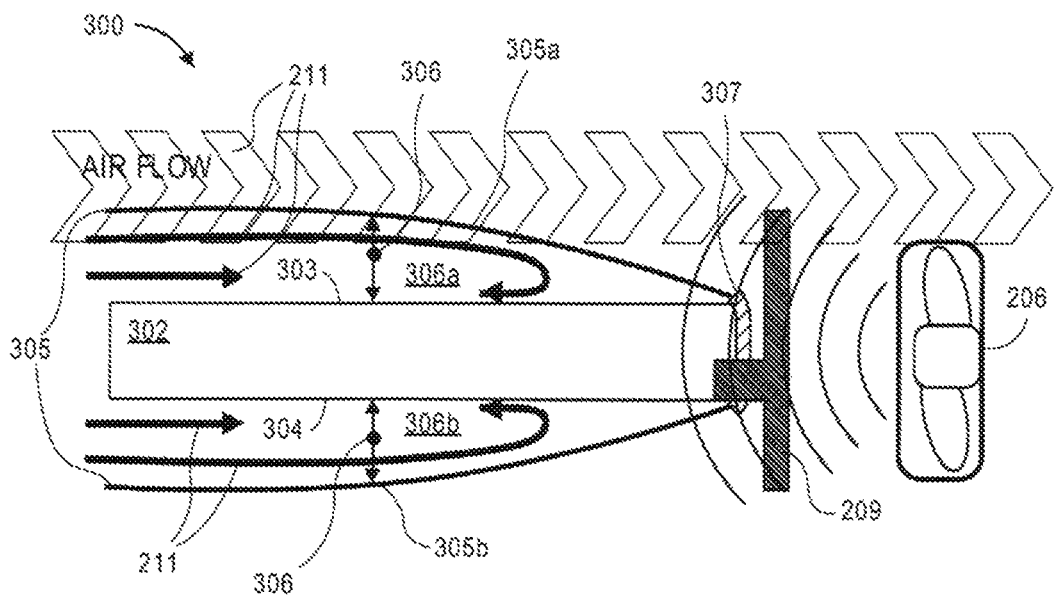
FIG. 3 is a side view illustrating a wrapped data storage device, according to an embodiment.

FIG. 3 is a side view illustrating a wrapped data storage device, according to an embodiment. A data storage device assembly 300 comprises a data storage device 302 comprising an enclosure that comprises a top cover 303 and a bottom base 304 (see, e.g., HDD housing 168 of FIG. 1) with which the cover 303 is coupled. Data storage device assembly 300 further comprises a flexible sheet of barrier material 305, such as a sound-absorbing and/or a sound-insulating material, covering at least a portion of the cover 303 and/or the base 304. Various alternative embodiments regarding the coverage of the flexible sheet of barrier material are described elsewhere herein.

According to an embodiment, the barrier material comprises at least in part a polyvinylidene chloride (PVDC) material, otherwise known by the trade name "Saran" and "Saran wrap". Other polymers made from vinylidene chloride may be implemented in this context, as well as other suitable materials in flexible form that have acoustic-absorbing and/or acoustic-insulating characteristics, known now or developed in the future. According to an embodiment, the barrier material consists of polyvinylidene chloride (PVDC), which has been found effective in attenuating vibrational acoustic energy transferred to and within an HDD and, thus, improving head positioning accuracy of the HDD including improving the NRRO (non-repeatable runout), for a non-limiting example.

According to an embodiment, data storage device assembly 300 further comprises a layer of air 306 between the sheet of barrier material 305 and the portion of the cover 303 and/or base 304 which the barrier material 305 covers. According to an embodiment, the layer of air 306 may at least in part be generated, augmented, supported by the airflow 211, such as that generated by the cooling fan 206. In this context, the term "layer" of air is used in a general manner, to characterize some amount of air in a relevant physical space, and is not intended to mean a true molecular layer of air. Evaluation has shown that the effect of wrapping or covering part of an HDD with a PVDC material improves the positioning accuracy of the HDD, while evaluation has also shown that wrapping or covering part of an HDD with a PVDC material along with a layer of air interspaced therebetween may improve the positioning accuracy of the HDD even more. In a scenario in which the data storage device 302 is housed in an enclosure (e.g., system chassis 204 of FIG. 2) containing a gas other than air (e.g., a sealed enclosure containing a lighter-than-air gas, such as helium for a non-limiting example), the layer of air 306 would take the form of a layer of the non-air gas.

Wrap-Around Barrier Material Structure

Figure 4:
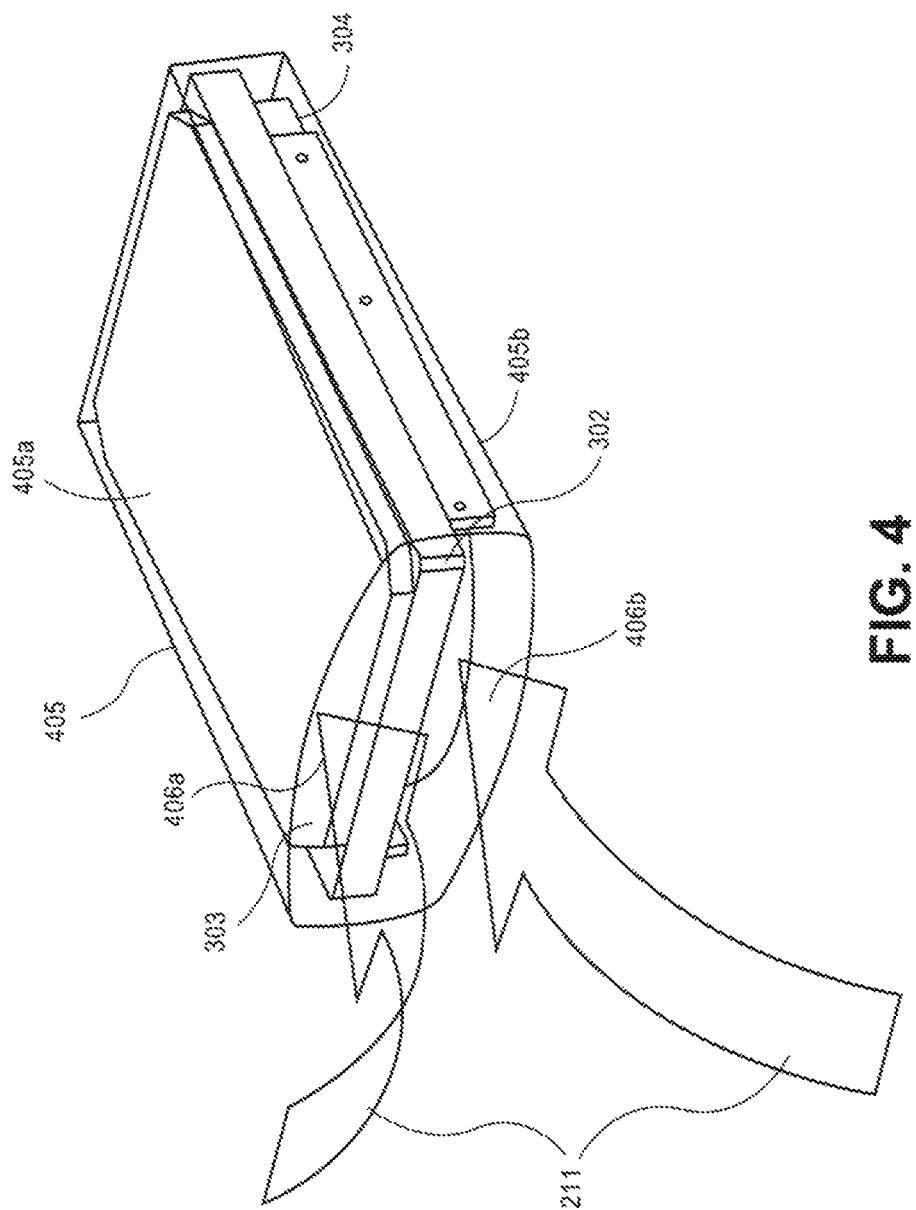
FIG. 4 is a perspective view illustrating a wrapped data storage device, according to an embodiment.

FIG. 4 is a perspective view illustrating a wrapped data storage device, according to an embodiment. According to an embodiment, the sheet of barrier material 305 is configured as, i.e., is in the form of, a wrap-around structure having at least one open end, and which envelopes the data storage device 302 on at least four sides. Reference is made to FIG. 4 for a non-limiting example of such a wrap-around structure of barrier material 405 that may be implemented to envelope the data storage device 302. While the appearance of the wrap-around barrier material 405 is of a five-sided bag-type structure with one open end, note that the back end of the wrap-around barrier material 405 depicted in FIG. 4 would need at least a partial opening or some way in which to electrically connect the data storage device 302 with a backboard/connector such as backboard 209 through the barrier material 405. Reference is made back to FIG. 3 for an embodiment in which a four-sided wrap-around barrier material 305 is used in conjunction with an adhesive tape 307 to close out the barrier material 305 around the interface between the data storage device 302 and the backboard 209.

In either configuration, that of FIG. 3 or that of FIG. 4, according to embodiments, one open end of the wrap-around barrier material 305, 405 may be positioned open to a primary direction of airflow (e.g., airflow 211 of FIGS. 2, 3, 4) in order to assist with inflating the wrap-around barrier material 305, 405, such that the layer of air 306, 406 comprises (a) a first layer of air 306a, 406a between the top cover 303 of the enclosure and a first corresponding portion 305a, 405a of the wrap-around barrier material 305, 405, and (b) a second layer of air 306b, 406b between the bottom base 304 of the enclosure and a second corresponding portion 305b, 405b of the wrap-around barrier material 305, 405.

Figure 5:
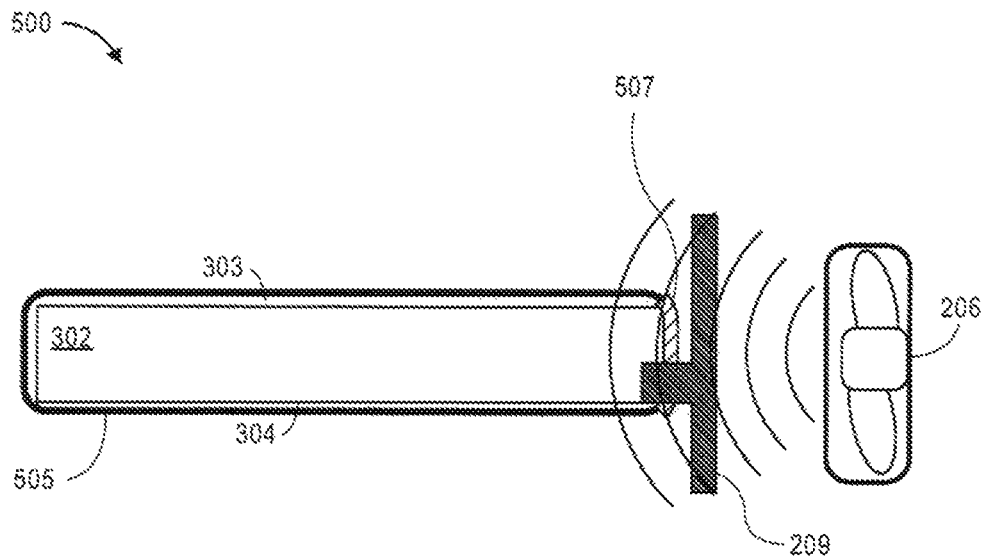
FIG. 5 is a side view illustrating a wrapped data storage device, according to an embodiment.
Figure 6A:
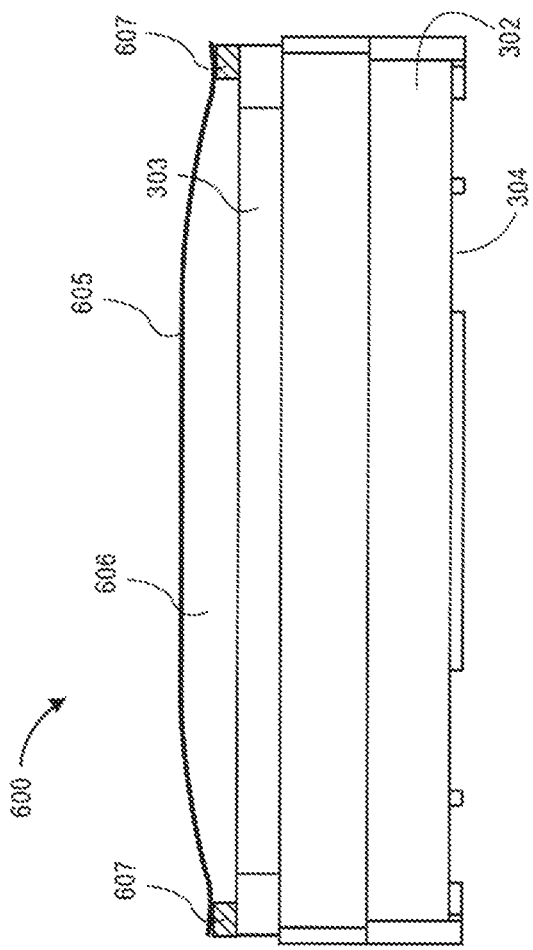
FIG. 6A is a front view illustrating a covered data storage device, according to an embodiment.

FIG. 5 is a side view illustrating a wrapped data storage device, according to an embodiment. As discussed, evaluation has shown that the effect of wrapping or covering part of an HDD with a PVDC material improves the positioning accuracy of the HDD, even in the absence of a layer of air such as layers of air 306a, 306b (FIG. 3), 406a, 406b (FIG. 4), 606 (FIG. 6A). Hence, FIG. 5 illustrates an embodiment of a data storage device assembly 500 in which a data storage device 302 is completely enveloped in a flexible sheet of barrier material 505, but for the back side of the data storage device 302, where the data storage device 302 mates with the backboard 209. According to an embodiment, the wrap-around barrier material 505 is used in conjunction with an adhesive tape 507 to close out the barrier material 505 around the interface between the data storage device 302 and the backboard 209. While the data storage device assembly 500 may comprise a layer or pockets of air at areas between the data storage device 302 and the barrier material 505, embodiments include scenarios in which the barrier material 505 is substantially flush with the outer surfaces of the data storage device 302 with no appreciable layer or pockets of air therebetween.

Adhered Barrier Material

Figure 6B:
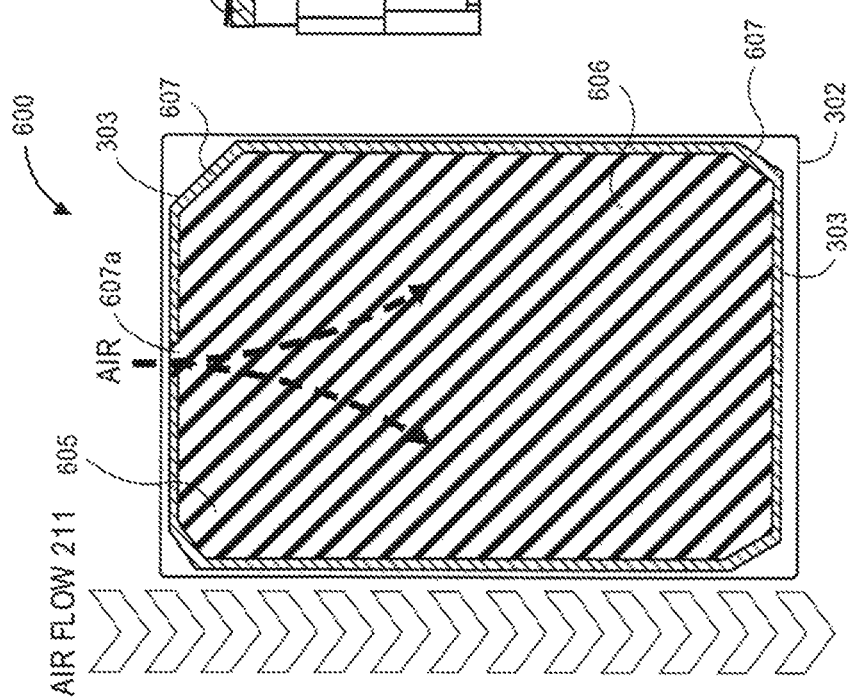
FIG. 6B is a top view illustrating the covered data storage device of FIG. 6A, according to an embodiment.

FIG. 6A is a front view illustrating a covered data storage device, and FIG. 6B is a top view illustrating the covered data storage device of FIG. 6A, according to an embodiment. A data storage device assembly 600 comprises a data storage device 302 comprising an enclosure that comprises a top cover 303 and a bottom base 304 with which the cover 303 is coupled. Data storage device assembly 600 further comprises a flexible sheet of barrier material 605, such as a sound-absorbing and/or a sound-insulating material, covering at least a portion of the cover 303, according to an embodiment. Further, data storage device assembly 600 may comprise, alternatively or in conjunction with the foregoing arrangement with the cover 303, a flexible sheet of barrier material such as barrier material 605 covering at least a portion of the base 304, according to an embodiment. As with the configuration of FIG. 3, according to embodiments the barrier material 605 comprises at least in part a polyvinylidene chloride (PVDC) material, or may comprise another polymer made from vinylidene chloride in this context, for reasons described elsewhere herein.

With reference to FIGS. 6A, 6B, according to embodiments the data storage device assembly 600 further comprises an adhesive 607 positioned around an outer edge of the top cover 303 (as depicted) and/or bottom base 304 of the data storage device 302 enclosure, which adheres the barrier material to the respective cover 303 and/or base 304. According to an embodiment, adhesive 607 bond line has a break 607a (or "opening", or "non-continuous section", or "discontinuity"), thereby allowing the air layer 606 to inflate and fill the space between the barrier material 605 and the top cover 303 (as depicted) and/or bottom base 304 via the break 607a. According to a similar embodiment, the data storage device assembly 600 comprises an adhesive such as adhesive 607 positioned at least intermittently around an outer edge of the top cover 303 and/or bottom base 304 of the data storage device 302 enclosure, which adheres the barrier material 605 to the respective cover 303 and/or base 304. With an intermittent application of adhesive 607, an air layer 606 may still form between the barrier material 605 and/or the top cover 303 (as depicted) and/or bottom base 304, via the intermittent voids in the adhesive 607 bond line.

Method of Assembling a Data Storage Assembly

Figure 7:
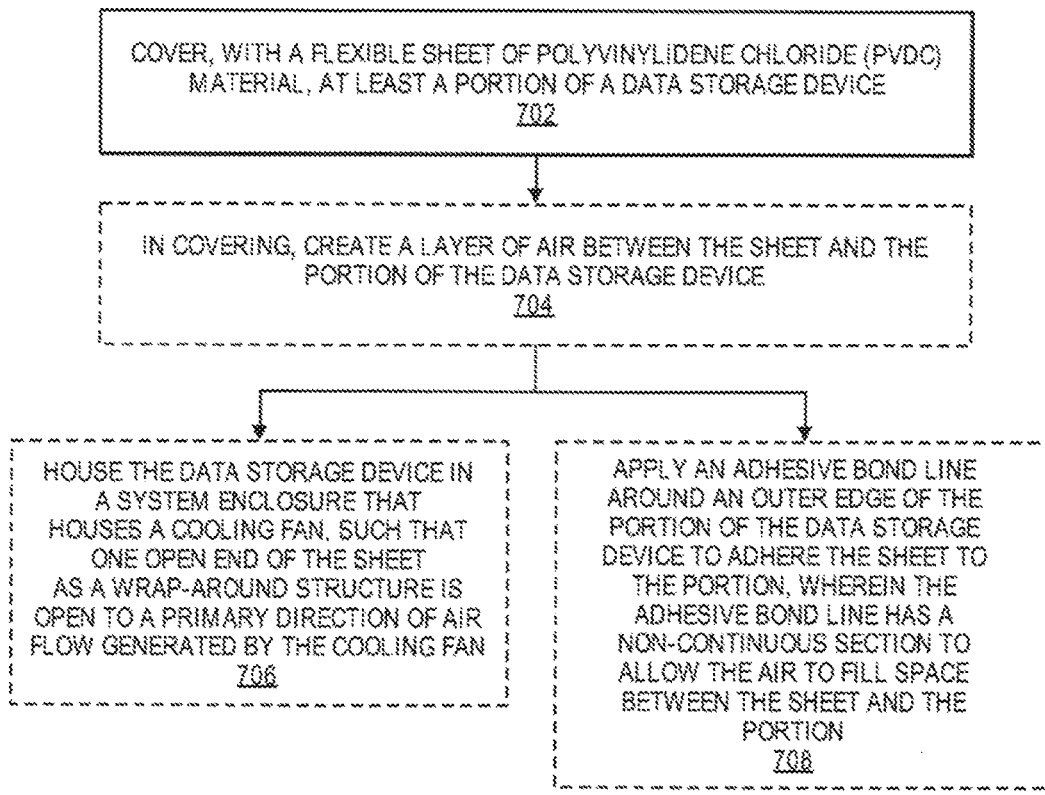
FIG. 7 is a flow diagram illustrating a method of assembling a data storage assembly, according to an embodiment.

FIG. 7 is a flow diagram illustrating a method of assembling a data storage assembly, according to an embodiment. For example, the method of FIG. 7 could be employed to assemble data storage assemblies such as those illustrated and described in reference to FIGS. 3, 4, 5, 6A, and 6B.

At block 702, at least a portion of a data storage device is covered with a flexible sheet of polyvinylidene chloride (PVDC) material. For example, at least a portion of data storage device 302 is covered with a flexible sheet of PVDC barrier material 305, 405, 505, 605 (FIGS. 3, 4, 5, 6A, 6B, respectively), according to an embodiment. The portion of the data storage device 302 that is covered at block 702 may be at least a portion of the top cover 303 (FIGS. 3, 4, 5, 6A, 6B) and/or of the bottom base 304 (FIGS. 3, 4, 5, 6A, 6B) of the data storage device 302 enclosure.

At optional block 704 (depicted as optional with a dashed block), in covering the portion of the data storage device with the flexible sheet of barrier material, a layer of air is created between the sheet and the portion of the data storage device. For example, in covering the data storage device 302 at block 702, a layer of air 306 (e.g., 306a and/or 306b) (FIG. 3), 406a, 406b (FIG. 4), 606 (FIG. 6A, 6B) is created between the sheet of barrier material 305, 405, 605, respectively, and the portion (e.g., cover 303 and/or base 304) of the data storage device 302.

At optional block 706, the data storage device is housed in a system enclosure that houses a cooling fan, such that one open end of the sheet of barrier material, embodied as a wrap-around structure, is open to a primary direction of airflow generated by the cooling fan. For example, the data storage device 302 is housed in a system enclosure (e.g., system chassis 204 of FIG. 2) that houses a cooling fan 206 (FIGS. 2, 3), such that one open end of the sheet of barrier material 305, 405, embodied as a wrap-around structure, is open to a primary direction of airflow 211 (FIGS. 2, 3, 4) generated by the cooling fan 206.

Alternatively to block 706, at optional block 708, an adhesive bond line is applied (e.g., dispensed) around an outer edge of the portion of the data storage device to adhere the sheet to the portion, where the adhesive bond line has a non-continuous section to allow air to fill the space between the sheet and the portion. For example, adhesive 607 (FIGS. 6A, 6B) is applied around an outer edge of the portion (e.g., the cover 303 and/or base 304) of the data storage device 302 to adhere the sheet of barrier material 605 (FIGS. 6A, 6B) to the portion, where the adhesive 607 bond line has a non-continuous section (e.g., opening 607a of FIG. 6B) to allow the layer of air 606 (FIGS. 6A, 6B) to fill the space between the sheet of barrier material 605 and the portion.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A data storage device assembly comprising:
   a data storage device comprising an enclosure comprising a bottom base and a top cover coupled with said base; and
   a flexible sheet of barrier material configured as a wrap-around structure having at least one open end and enveloping said data storage device on at least four sides;
   wherein one said open end of said wrap-around structure is open to a primary direction of gas flow such that a layer of gas inflating said sheet comprises (a) a first layer of gas between said cover and a first corresponding portion of said sheet and (b) a second layer of gas between said base and a second corresponding portion of said sheet.

2. The data storage device assembly of claim 1, wherein said barrier material comprises polyvinylidene chloride (PVDC).

3. The data storage device assembly of claim 1, wherein said barrier material consists of polyvinylidene chloride (PVDC).

4. A data storage system assembly comprising:
   a data storage device assembly comprising:
      a data storage device comprising an enclosure comprising a bottom base and a top cover coupled with said base,
      a flexible sheet of acoustic-absorbing and/or acoustic-insulating barrier material covering at least a portion of said cover and/or said base, and
      a layer of gas between said sheet of barrier material and said portion of said cover and/or said base; and
   a cooling fan that flows gas between said sheet of barrier material and said portion of said cover and/or said base, thereby generating said layer of gas.

5. The data storage system assembly of claim 4, wherein said barrier material comprises polyvinylidene chloride (PVDC).

6. The data storage system assembly of claim 4, wherein said sheet of barrier material is configured as a wrap-around structure having at least one open end and envelopes said data storage device on at least four sides.

7. The data storage system assembly of claim 6, wherein one said open end of said wrap-around structure is open to a primary direction of gas flow such that said layer of gas comprises (a) a first layer of gas between said top cover of said enclosure and a first corresponding portion of said wrap-around structure and (b) a second layer of gas between said bottom base of said enclosure and a second corresponding portion of said wrap-around structure.

8. The data storage system assembly of claim 4, further comprising:
   an adhesive positioned around an outer edge of said top cover of said enclosure of said data storage device and adhering said barrier material to said top cover.

9. The data storage system assembly of claim 4, further comprising:
   an adhesive bond line around an outer edge of said top cover of said enclosure of said data storage device and adhering said barrier material to said top cover, wherein said adhesive has a break in said bond line thereby allowing said gas layer to fill space between said barrier material and said top cover.

10. The data storage system assembly of claim 4, further comprising:
    an adhesive positioned around an outer edge of said bottom base of said enclosure of said data storage device and adhering said barrier material to said bottom base.

11. The data storage device assembly of claim 4, further comprising:
    an adhesive bond line around an outer edge of said bottom base of said enclosure of said data storage device and adhering said barrier material to said bottom base, wherein said adhesive has a break in said bond line thereby allowing said gas layer to fill space between said barrier material and said bottom base.

12. A method of assembling a data storage assembly, the method comprising:
    enveloping a data storage device on at least four sides with a flexible sheet of polyvinylidene chloride (PVDC) material configured as a wrap-around structure having at least one open end, such that gas is between said sheet and at least a portion of said data storage device; and
    housing said data storage device in a system enclosure that houses a cooling fan, such that one said open end of said wrap-around structure is open to a primary direction of gas flow generated by said cooling fan.

13. A data storage device assembly comprising:
    a data storage device comprising an enclosure comprising a bottom base and a top cover coupled with said base;
    a flexible sheet of barrier material covering at least a portion of said cover and/or said base;
    an adhesive positioned around an outer edge of said cover and/or said base and adhering said barrier material to said cover and/or said base; and
    a gas inflating said sheet around said portion of said cover and/or said base.

14. The data storage device assembly of claim 13, wherein:
    said adhesive forms an adhesive bond line around said outer edge of said cover and/or said base; and
    said adhesive has a break in said bond line thereby allowing said gas to fill space between said barrier material and said cover and/or base.

15. A method of assembling a data storage assembly, the method comprising:
    covering, with a flexible sheet of polyvinylidene chloride (PVDC) material, at least a portion of a data storage device; and
    applying an adhesive around an outer edge of said portion of said data storage device to adhere said sheet to said portion, wherein said adhesive has a non-continuous section to allow a layer of gas to fill space between said sheet and said portion of said data storage device.

\* \* \* \* \*